(12) United States Patent
Elliott et al.

(10) Patent No.: US 6,406,103 B1
(45) Date of Patent: Jun. 18, 2002

(54) VARIABLE BURN OUT TIMER

(76) Inventors: John M. Elliott; Patti Elliott, both of Rte. 1, Box 60AA, Pearson, GA (US) 31642

( * ) Notice: Subject to any disclaimer, the term of this patent is extended or adjusted under 35 U.S.C. 154(b) by 0 days.

(21) Appl. No.: 09/656,507

(22) Filed: Sep. 6, 2000

(51) Int. Cl.[7] .............................. B60L 1/00; B60L 3/00; H02G 3/00
(52) U.S. Cl. ....................................... 303/20; 307/10.1
(58) Field of Search ........................... 303/3, 15, 20; 307/10.1

(56) References Cited

U.S. PATENT DOCUMENTS

| | | | | |
|---|---|---|---|---|
| 4,467,219 A | * | 8/1984 | Reid | 307/10.1 |
| RE32,474 E | * | 8/1987 | Reid | 307/10.1 |
| 4,812,671 A | * | 3/1989 | Furrow | 307/10.1 |
| 4,840,157 A | * | 6/1989 | Furrow | 123/352 |
| 5,652,468 A | * | 7/1997 | Reid | 307/10.1 |
| 5,722,293 A | * | 3/1998 | McFadden | 74/336 R |

* cited by examiner

*Primary Examiner*—Christopher P. Schwartz
(74) *Attorney, Agent, or Firm*—Siemens Patent Services, LC

(57) ABSTRACT

In drag racing it is important to heat the rubber of the rear tires in order to gain added traction, which is typically done through what is called a burn out, or spinning the rear tires on wet pavement until they become hot. At the same time, it is important that the tires not become overly hot, as excessive heating reduces traction. Therefore the length of the burn out is critical. Drag racing vehicles are typically equipped with a device called a line lock, which, when the brake is engaged locks the brake line to maintain pressure on the brake fluid after the brake pedal is released. Locking the front brakes in such a manner allows the driver to gun the engine while the vehicle is in gear, thus spinning the rear tires. The line lock is activated by a line lock button, usually mounted on the steering wheel, which opens and closes a solenoid, activating the line lock. The present invention is designed to provide a device for variably controlling the duration for which the line lock is engaged, and thus the duration of a burn out so the tires are sufficiently heated, yet not overheated.

5 Claims, 2 Drawing Sheets

VARIABLE BURN OUT TIMER

BACKGROUND OF THE INVENTION

1. Field of the Invention

The present invention relates to the sport of drag racing and the need to heat (burn out) the rubber of the tires before beginning a run. More particularly, the invention comprises a device for variably controlling the length of time that the tires of a drag racer are allowed to spin during the burn out process.

2. Description of the Prior Art

In drag racing it is important to heat the rubber of the rear tires in order to gain added traction. This is typically done through what is called a burn out, or spinning of the rear tires on wet pavement until they become hot. At the same time, it is important that the tires not become overly hot, so the length of the burn out is critical.

Several drag racing related timers exist, including;

U.S. Pat. No. 5,722,293, issued to Patrick A. McFadden on Mar. 3, 1998, relates to a method for controlling a transmission in a drag racing vehicle, whereby upon launching the vehicle an interval timer is activated and the transmission is automatically shifted to the next higher gear upon the attainment of a predetermined time interval or predetermined engine revolutions per minute (RPM), whichever occurs first. As each gear shift occurs, a second or third interval timer is reactivated to accomplish subsequent shifts at the attainment of predetermined time intervals or RPM. Unlike the present invention, McFadden does not aid the driver in accomplishing a burn out prior to launching the vehicle.

U.S. Pat. No. 4,840,157, issued to Robert E. Furrow on Jun. 20, 1989, relates to an engine speed control circuit for drag racing, wherein a circuit is provided for temporarily reducing speed of a racing vehicle engine during a time interval that can be selected to start at a precisely determined moment during a race for a precisely determined duration. This device is useful in what is called interval racing, where a driver's goal is to complete the course in a prescribed time and cutting power once the vehicle has attained a prescribed speed is just a critical as attaining the prescribed speed in the first place. Again, unlike the present invention, Furrow does not aid the driver in accomplishing a burn out prior to launching the vehicle.

U.S. Pat. No. 4,467,219 and Re. 32,474, issued to Dennis Reid on Aug. 21, 1984 and Aug. 11, 1987, respectively, relate to a variable time delay apparatus for controlling the start of a vehicle, and U.S. Pat. No. 5,652,468 issued to Dennis Reid on Jul. 29, 1997 refers to a cross-over compensation circuit, wherein a transmission braking device is engaged with an electronically timed release. With Reid's devices, a drag racing vehicle's engine is started and the vehicle moved to the starting line. As the starting light tree counts down to the start, the device is engaged to hold the vehicle in position while the driver applies power to the engine. If the device was engaged properly, the timing device should release the braking device as the start light turns green, allowing an instantaneous start. Reid's devices apply braking to the transmission, preventing all power from reaching the wheels, unlike the present invention which applies braking to the front wheels freeing the rear wheels to spin for the burn out.

None of the above inventions and patents, taken either singly or in combination, is seen to describe the instant invention as claimed.

SUMMARY OF THE INVENTION

As stated previously, in drag racing it is important to heat the rubber of the rear tires in order to gain added traction, which is typically done through what is called a burn out, or spinning the rear tires on wet pavement until they become hot. At the same time, it is important that the tires not become overly hot, so the length of the burn out is critical. Drag racing vehicles are typically equipped with a device called a line lock, which, when the brake is engaged locks the brake line to maintain pressure on the brake fluid after the brake pedal is released. Locking the front brakes in such a manner allows the driver to gun the engine while the vehicle is in gear, thus spinning the rear tires. The line lock is activated by a line lock button, usually mounted on the steering wheel, which opens and closes a solenoid, activating the line lock. The present invention is designed to provide a device for variably controlling the duration for which the brake lock is engaged, and thus the duration of a burn out so the tires are sufficiently heated, yet not overheated.

Accordingly, it is a principal object of the invention provide a timer for tire burn out which will be sanctioned by the International Hot Rod Association (IRHA) and the National Hot Rod Association (NHRA).

It is another object of the invention to provide a timer for tire burn out which is easy to install in a drag racing vehicle.

It is a further object of the invention to provide a timer for tire burn out which is easy for a novice drag racer to use.

Still another object of the invention is to provide a timer for tire burn out which is accurate.

An additional object of the invention is to provide a timer for tire burn out which is economical to purchase.

It is again an object of the invention to provide a timer for tire burn out which is easy to install.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
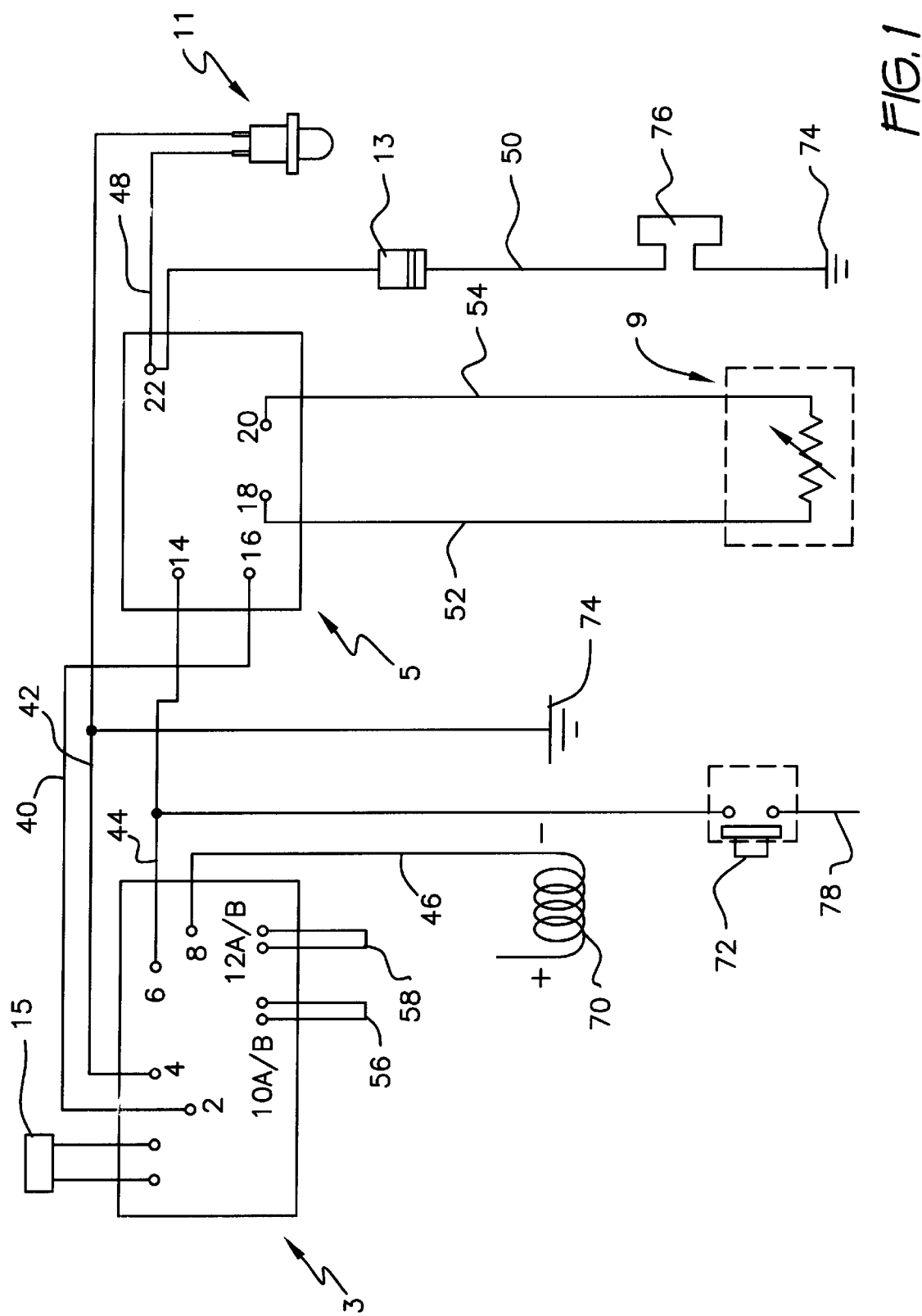
FIG. 1 is a schematic diagram of the invention.
Figure 2:
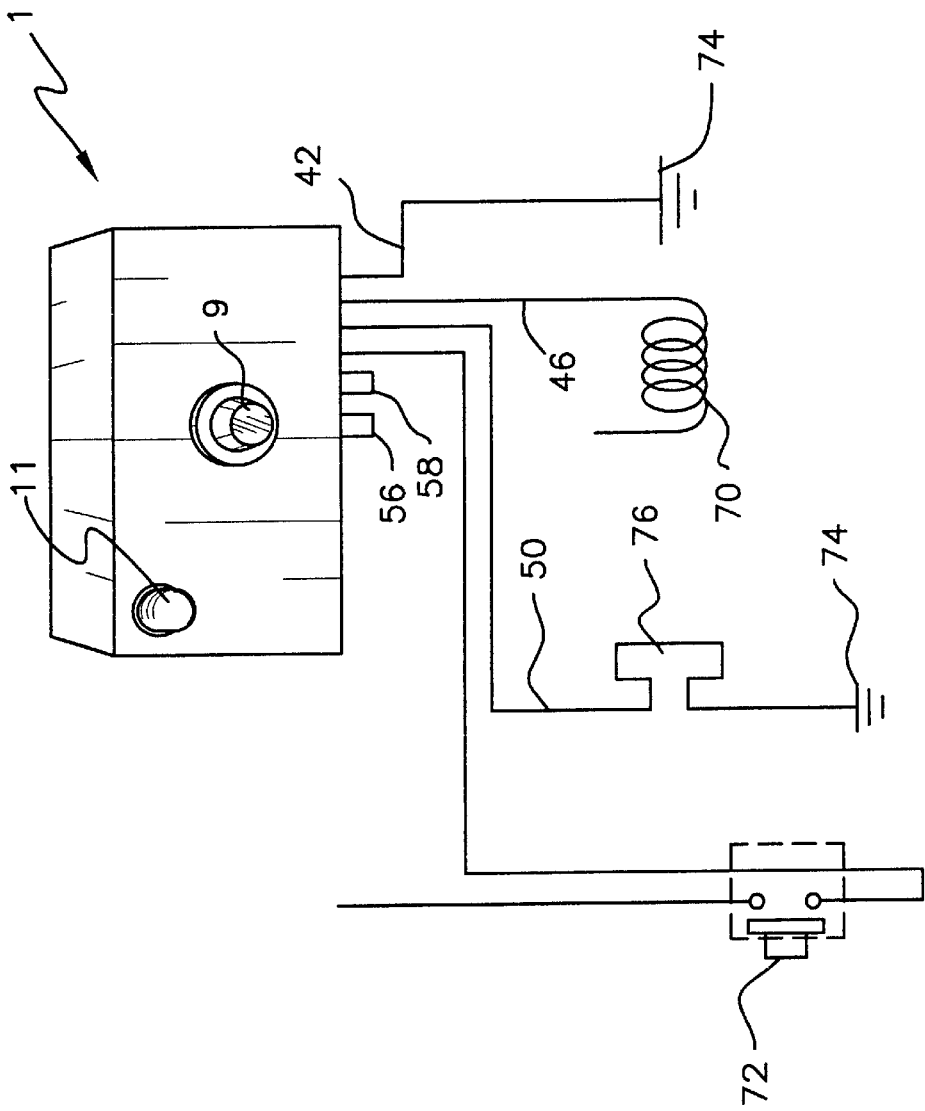
FIG. 2 is an environmental perspective of the invention.

In the preferred embodiment of the invention, an RPM activated switch 3, FIG. 1, such as Autotronic Controls Corporation's part number 8950, and a timed delay relay 5, FIG. 1, such as Airtronics part number TGCB7010B3H are mounted within a closed case 1, FIG. 2. Mounted through the face of case 1, FIG. 2, are a rotary potentiometer switch 9 and line lock indicator light 11. Two wire loops 56 and 58 from RPM activated switch 3 protrude through the bottom of case 7. Wire loops 56 and 58 are used to configure the RPM activated switch for either a 4, 6, or 8 cylinder engine. Wires 42, 44, 46, and 50, which connect to the various external components (to be explained later) of the drag racing vehicle, also protrude through the bottom of case 7.

In FIG. 1, terminal 2 of RPM activated switch 3 is connected to terminal 16 of timed delay relay 5 by wire 40. Terminal 4, RPM switch 3 is connected to one side of line lock light 11 and to chassis ground 74 by wire 42. Terminal 6, RPM switch 3 is connected to terminal 14, timed delay relay 5 and to the positive side of line lock button 72 by wire 44, such that when line lock button 72 is depressed both terminal 6 and terminal 14 are active. Terminal 8, the RPM activated switch, is connected to the tachometer terminal of the vehicle's multisparking device (MSD) 70 (not shown) or the negative side of the vehicle's coil 70 (not shown), if the vehicle is not equipped with an MSD, by wire 46. Terminals 10A and 10B, RPM activated switch, are connected by wire 56 and terminals 12A and 12B are connected by wire 58. As stated previously, wire loops 56 and 58 are used to configure the RPM activated switch for a 4, 6, or 8 cylinder engine. Terminals 18 and 20, timed delay relay 5, are attached by wires 52 and 54 to potentiometer 9. Terminal 22 (prior to diode 13), timed delay relay 5 is connected to the second side of line lock light 11 by wire 48. Terminal 22 (after diode 13), timed delay relay 5 is also connected to the line lock solenoid 76 (not shown) by wire 50.

In operation after installation in a drag racing vehicle, the driver determines the desired duration of a burn out and sets potentiometer switch 9 for the desired duration of from zero to ten seconds. He then depresses the brake pedal to pressure the brake line. He then depresses line lock button 72 and holds it, closing the switch in line lock button 72 and allowing current to flow to the solenoid to activate the brake lock, which maintains pressure in the front brake lines, while simultaneously allowing current to flow to terminal 6, RPM activated switch 3 and terminal 14, time delayed relay 5. Line lock indicator light 11 will light indicating that the line lock is engaged. While continuing to depress line lock button 72, the driver depresses the gas pedal accelerating the engine. When the engine reaches a preset speed (as determined by the 2.2 k Ohm resister 15 (an integral part of RPM activated switch 3), RPM activated switch 3 activates time delay relay 5, which counts down from the pre-set time. At the expiration of the pre-set time, solenoid 76 opens. This, in turn, disengages the line lock, allowing the vehicle to move forward, ending the burn out. Releasing line lock button 72 resets variable burn out timer 1 for the next use.

It is to be understood that the present invention is not limited to the embodiments described above, but encompasses any and all embodiments within the scope of the following claims.

We claim:

1. A timer for a drag racing vehicle, comprising;
    means for setting the duration of a timed delay for releasing a front wheel braking system line lock, a device for maintaining brake fluid pressure after the brake pedal has been depressed, for said drag racing vehicle,
    means for indicating that said front wheel braking system line lock is engaged,
    means for initiating a timed delay for releasing said front wheel braking system line lock,
    means for time delaying the release of said front wheel braking system line lock.

2. A timer for a drag racing vehicle, as defined in claim 1, wherein;
    said means for setting the duration of a timed delay for releasing said front wheel braking system line lock is a rotary potentiometer,
    said means for indicating that said front wheel braking system line lock is engaged is a line lock indicator light,
    said means for initiating a timed delay for releasing said front wheel braking system line lock is an RPM activated switch,
    said means for time delaying the release of said front wheel braking system line lock is a timed delay relay.

3. A timer for a drag racing vehicle, as defined in claim 1, wherein;
    said means for setting the duration of a timed delay for releasing said front wheel braking system line lock is a digital timer,
    said means for indicating that said front wheel braking system line lock is engaged is a line lock indicator light,
    said means for initiating a timed delay for releasing said front wheel braking system line lock is an RPM activated switch,
    said means for time delaying the release of said front wheel braking system line lock is a timed delay relay.

4. A method, using a timer for a drag racing vehicle, whereby the driver of said drag racing vehicle can heat the rear tires of said drag racing vehicle, comprising the steps of;
    backing said drag racing vehicle into a water box, a paved area with standing water,
    selecting a desired duration for which the rear tires of said drag racing vehicle will spin in said water box to heat said tires by setting a rotary potentiometer for a predetermined period of time of from 1 to ten seconds,
    depressing and holding said vehicle's brake pedal, engaging said vehicle's brakes,
    depressing and holding said vehicle's line lock button (the activating switch for a front wheel braking system line lock, a device for maintaining brake fluid pressure after the brake pedal has been released), activating a solenoid which engages said vehicle's front wheel braking system line lock, keeping said brakes engaged and also illuminating a line lock indicator light,
    releasing said brake pedal while continuing to hold said line lock button,
    depressing said vehicle's accelerator, gunning the engine with the transmission in gear, which in turn causes the rear wheels of said vehicle to spin while said front brakes hold said vehicle in position, whereupon;
    when said engine attains a preset speed, an RPM activated switch closes, causing
        a timed delay relay to begin counting down from said duration set on said rotary potentiometer, at the conclusion of which said timed delay relay extinguishes said line lock indicator light and opens said brake line solenoid, which opens said brake line lock and releases said front brake, allowing said rear wheels to gain traction and move said vehicle forward, completing said heating of said tires, and
        release of said line lock button opens said switch, denying power to said RPM activated switch and said timed delay relay, resetting said RPM activated switch and said timed delay relay for the next use of said RPM activated switch and said timed delay relay.

5. A timer for a drag racing vehicle, as defined in claim 2, in combination with a front wheel braking system line lock.

* * * * *